(12) United States Patent
Moyer et al.

(10) Patent No.: US 8,205,068 B2
(45) Date of Patent: Jun. 19, 2012

(54) BRANCH TARGET BUFFER ALLOCATION

(75) Inventors: William C. Moyer, Dripping Springs, TX (US); Jeffrey W. Scott, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 614 days.

(21) Appl. No.: 12/181,363

(22) Filed: Jul. 29, 2008

(65) Prior Publication Data
US 2010/0031010 A1    Feb. 4, 2010

(51) Int. Cl.
*G06F 9/00* (2006.01)
(52) U.S. Cl. ...................................... 712/238
(58) Field of Classification Search ............... 712/238
See application file for complete search history.

(56) References Cited

U.S. PATENT DOCUMENTS

| | | | |
|---|---|---|---|
| 5,692,167 A * | 11/1997 | Grochowski et al. | 712/226 |
| 5,740,415 A | 4/1998 | Hara | |
| 5,978,909 A | 11/1999 | Lempel | |
| 6,088,793 A | 7/2000 | Liu et al. | |
| 6,151,672 A | 11/2000 | Hunt | |
| 6,247,122 B1 | 6/2001 | Henry et al. | |
| 6,353,882 B1 | 3/2002 | Hunt | |
| 6,895,498 B2 | 5/2005 | McDonald et al. | |
| 7,096,348 B2 | 8/2006 | Moyer et al. | |
| 7,107,437 B1 | 9/2006 | Padwekar | |
| 7,783,870 B2 * | 8/2010 | Levitan et al. | 712/238 |
| 7,937,573 B2 | 5/2011 | Moyer et al. | |
| 2002/0166042 A1 | 11/2002 | Almog et al. | |
| 2002/0199091 A1 | 12/2002 | Tago et al. | |
| 2004/0225872 A1 | 11/2004 | Bonanno et al. | |
| 2005/0091479 A1 | 4/2005 | Chung | |
| 2006/0242392 A1 | 10/2006 | Elwood | |
| 2007/0239974 A1 * | 10/2007 | Park et al. | 712/238 |
| 2008/0040590 A1 * | 2/2008 | Lee et al. | 712/238 |
| 2008/0040591 A1 * | 2/2008 | Moyer et al. | 712/238 |
| 2008/0168263 A1 | 7/2008 | Park | |
| 2009/0222648 A1 * | 9/2009 | Moyer et al. | 712/238 |

OTHER PUBLICATIONS

PCT/US2009/043452 International Search Report and Written Opinion mailed May 11, 2009.
McFarland; WRL Techinical Note TN-36; "Combining Branch Predictors"; Western Research Laboratory, California Jun. 1993.
Jacobsen et al; "Assigning Confidence to Conditional Branch Predictions"; IEEE, pp. 142-152, 1996.
Lee et al; "Branch Predictions Strategies and Branch Target Buffer Design"; IEEE, pp. 6-22, 1984.
PCT/US2009043452, Extended European search report dated Jul. 7, 2011.

* cited by examiner

*Primary Examiner* — Jacob Petranek
(74) *Attorney, Agent, or Firm* — James L. Clingan, Jr.; Daniel D. Hill

(57) ABSTRACT

A data processing system and method are provided for allocating an entry in a branch target buffer (BTB). The method comprises: receiving a branch instruction to be executed in a data processor; determining that the BTB does not include an entry corresponding to the branch instruction; identifying an entry in the BTB for allocation, the identified entry in the BTB comprising a target identifier and a first prediction value for a previously received branch instruction; determining whether to allocate the branch instruction to the identified entry in the BTB based on a comparison of the first prediction value to a second prediction value, wherein the second prediction value is generated from a branch history table (BHT); and allocating the branch instruction to the identified entry if the second prediction value indicates a more strongly taken prediction than the first prediction value.

19 Claims, 2 Drawing Sheets

| BTB REPLACEMENT CANDIDATE STATE | BHT PREDICTION FOR CURRENT BRANCH INSTRUCTION | RESULTING ALLOCATION DECISION |
|---|---|---|
| STRONGLY NOT-TAKEN | STRONGLY NOT-TAKEN | ALLOCATE |
| | WEAKLY NOT-TAKEN | ALLOCATE |
| | WEAKLY TAKEN | ALLOCATE |
| | STRONGLY TAKEN | ALLOCATE |
| WEAKLY NOT-TAKEN | STRONGLY NOT-TAKEN | ALLOCATE |
| | WEAKLY NOT-TAKEN | ALLOCATE |
| | WEAKLY TAKEN | ALLOCATE |
| | STRONGLY TAKEN | ALLOCATE |
| WEAKLY TAKEN | STRONGLY NOT-TAKEN | NO ALLOCATE |
| | WEAKLY NOT-TAKEN | ALLOCATE |
| | WEAKLY TAKEN | ALLOCATE |
| | STRONGLY TAKEN | ALLOCATE |
| STRONGLY TAKEN | STRONGLY NOT-TAKEN | NO ALLOCATE |
| | WEAKLY NOT-TAKEN | NO ALLOCATE |
| | WEAKLY TAKEN | ALLOCATE |
| | STRONGLY TAKEN | ALLOCATE |

*FIG. 2*

BRANCH TARGET BUFFER ALLOCATION

BACKGROUND

1. Field

This disclosure relates generally to semiconductor processors, and more specifically, to semiconductor processors having branch target buffers.

2. Related Art

Branch prediction is a common technique used to avoid or reduce times when the processor is idle. Often included in branch prediction is use of a branch target buffer (BTB) that is used to store branch information that is expected to re-used in order to accelerate the execution of branch instructions. BTB entries are used to speed up the process of fetching a branch target instruction located at the branch destination by caching information associated with a branch instruction within a BTB entry. When executing the branch instruction, the destination of the branch instruction (the branch target instruction) is loaded into an instruction queue within the processor. Preferably an entry for the predicted branch is in the BTB so that the branch target can be quickly obtained and loaded into the instruction queue. It takes longer to obtain and load a branch target that is not in the BTB with the result that there may be clock cycles where the central processing unit (CPU) is idle. Thus, it is desirable for the BTB to be loaded such that every time there is a branch there is a hit in the BTB. This is not likely to be accomplished but it is desirable to have few times where the branch target must be obtained outside the BTB. An overview of branch prediction issues and alternatives for BTB design are presented in J. K. L. Lee and A. J. Smith. "Branch prediction strategies and branch target buffer Design". *Computer,* 17(1), January 1984.

Supplemental branch predictor structures may be combined with a BTB in order to enhance branch performance as well. Since BTB entries contain branch target information along with an optional predictor, they are large, and only a limited number of entries may be provided. In order to supplement branch performance, one or more additional branch predictor structures may be used in conjunction with a BTB to predict the direction of unresolved conditional branches, and allow for speculative fetching and optional execution of a predicted branch path. One such structure commonly used is a branch history table (BHT) which contains a collection of small predictors. No branch target information is stored, thus the capacity of a BHT may be larger for a given area than a BTB. In a BHT, a history of previous branch outcomes is stored for each branch, or for a global history of branch outcomes, and the table is searched to obtain a branch prediction. BHT predictors may be built with high degrees of accuracy with moderate costs. Note that with a BHT, the execution time is larger than if the branch hits in the BTB, but is reduced relative to not using a branch predictor. A good survey of BHT styles, and more complex structures may be found in S. McFarling, "Combining Branch Predictors", DEC WRL-TN-36.

In addition to the BTB and BHT structures described, another branch acceleration technique is use of a confidence predictor. Confidence predictors assign a confidence level for assessing the likelihood that a branch prediction is correct. A branch predictor confidence mechanism may be used to modify a prediction obtained from a branch predictor based on the confidence level provided, in order to further increase the effectiveness of branch prediction. Confidence predictors may also be used in hybrid branch prediction schemes as a dynamic selector. In a hybrid branch prediction scheme, multiple predictors are implemented, and a selection is made from one of the predictors for each branch. This selection may be based on a confidence predictor, or on confidence logic which attempts to ascertain the best predictor for each branch outcome. Additional information on confidence predictors and on confidence logic may be found in E. Jacobsen, E. Rotenberg, and J. E. Smith, "Assigning Confidence to Conditional Branch Predictions", MICRO-29.

One technique for increasing the likelihood that the branch is in the BTB is for the BTB to have a large storage capacity. Increasing the size of the BTB increases the cost of the BTB, thus increasing the area of the integrated circuit that has the processor. Although, the area increase may be small, it can be significant, especially for low cost processors. Thus, there is a need for a technique, that does not require additional storage in the BTB, for avoiding or reducing the situations where the loading of the buffer with branch targets results in clock cycles where the processor is idle.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a table useful in understanding the operation of the processor of FIG. 1.

DETAILED DESCRIPTION

Figure 1:
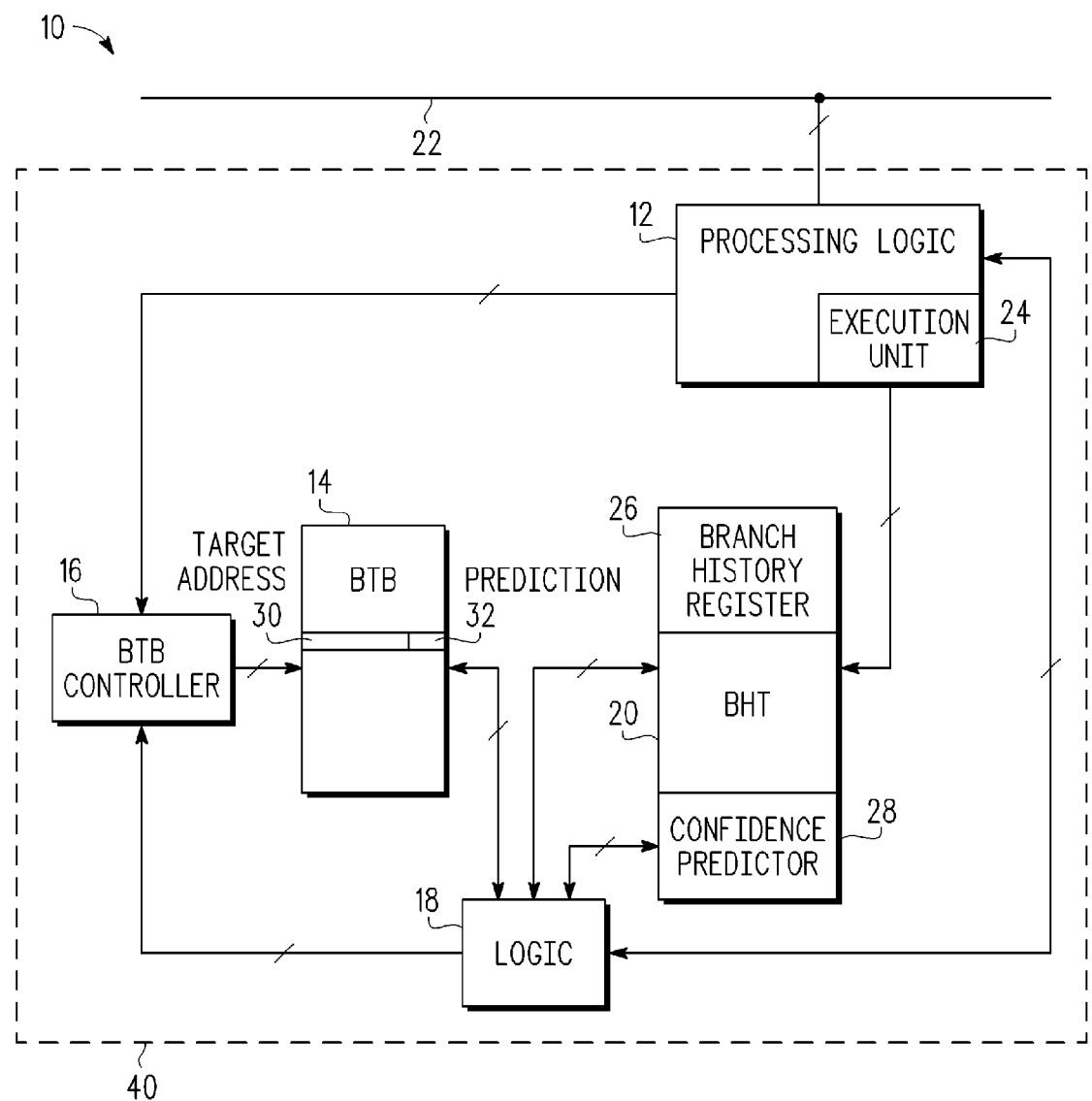
FIG. 1 is a block diagram of a processor having a branch target buffer (BTB) according to an embodiment.

In one aspect, a processor has a branch target buffer (BTB) which is used for storing branch instruction addresses that are expected to be predicted for use by the processor. The BTB entries contain branch target information, along with a predictor for the corresponding branch. In allocating entries in the BTB for branches which miss in the BTB, a branch currently in the BTB is identified as the one most likely to be replaced and may be called a replacement candidate. Associated with the replacement candidate is a likelihood of being used in the future. A branch, which may be called a current branch, that has been recently executed by the processor but is not in the BTB is considered for replacing the replacement candidate rather than automatically replacing the replacement candidate. The stored prediction information of the replacement candidate is compared to the prediction of the current branch and the decision to allocate is based on that comparison. If the current branch is considered more likely to be taken than the replacement candidate branch, then an allocation is performed and the current branch replaces the replacement candidate. If the replacement candidate branch is considered more likely to be taken than the current branch, then processor does not perform the allocation and the replacement candidate is retained in the BTB. The confidence of the prediction may also be used in making the determination as to which is more likely to be used. This is better understood by reference to the drawings and the following description.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Shown in FIG. 1 is a data processing system 10 comprising a processor 40 and a bus 22. Data processing system 10 may additionally comprise memory and I/O units, and various other circuitry not shown. Processor 40 comprises processing logic 12 coupled to bus 22, a BTB 14, a BTB controller 16, logic 18, a branch history table (BHT) 20. Processor 40 may be any type of processor, such as, for example, a microprocessor, microcontroller, digital signal processor, etc. In one embodiment, processor 40 may be referred to as a processor core. In another embodiment, processor 40 may be one of many processors in a multi-processor data processing system. Furthermore, although not illustrated as such, processor 40 may be a pipelined processor. Processor 40 may comprise additional circuitry, not shown, for clarity in understanding the operation of the present invention. Processing logic 12 has an execution unit. BHT 20 has a branch history register 26 and a confidence predictor 28. Processing logic 12 has an output from execution unit 24 coupled to BTB controller 16. BTB 14 has an output coupled to logic 18. BHT 20 has a first output coupled to logic 18 and a second output from confidence predictor 28 coupled to logic 18. Logic 18 has an output coupled to BTB controller 16. In this example, BTB may have a relatively small number of possible entries such as 32. One of those entries, as an example, is shown in FIG. 1 as having two portions; a target address 30 and a prediction 32. Each entry also has a branch instruction address that is not shown which is used as tag information for determining a hit. The branch instruction address is used to determine if there is a hit in BTB 14 by comparison with the stored tag information of each entry in BTB 14. Also in the entry there may be additional bits not shown such a valid bit. In this example prediction 32 has two bits to indicate one of four conditions; strongly not-taken, weakly not-taken, weakly taken, and strongly taken. These four possibilities are commonly identified for a target address. This two bit prediction information has previously been used in the prior art to assist in predicting whether a branch will be taken or not taken and directing instruction fetching accordingly. When an executing branch instruction hits in the BTB 14, the matching entry provides the target address of the branch (target address 30) and a prediction about whether the branch will be taken or not taken based on the state of prediction 32 to logic 18. Logic 18 provides this information to processing logic 12 to allow processing logic 12 to direct instruction fetching and execution of the predicted path of the branch.

In operation, processor 40 executes instructions according to an instruction buffer in processing logic 12. When a branch instruction (or simply branch) is decoded and begins execution, then it becomes the current branch. Upon the execution of each branch, BHT 20 updates the branch history including the predictor selected by the branch as well as branch history register 26 based on the outcome of the branch. Branch history register 26 stores the outcome of the last N branches. In one embodiment, branch history register 26 is implemented as a shift register, and each time a branch instruction is executed, a value of 0 is shifted into the register if the branch is not taken, and a value of 1 is shifted into the register if the branch is taken. The oldest value from the register is discarded. Branch history register 26 thus provides a taken/not taken history of the last N executed branches, providing a global history of branch behavior. The size of the branch history register 26 may vary in different embodiments. In a typical embodiment, N may range from 0 (in which case there is no branch history register implemented) to a small maximum number, such as 16. For the case where the current branch is not in BTB 14, BHT 20 provides a two bit predictor for the current branch representing one of the four states of strongly not-taken, weakly not-taken, weakly taken, and strongly taken. BHT 20 provides the two bit predictor for the current branch to logic 18. In operation, BHT 20 stores a plurality of predictors, and a predictor is selected for the current branch from the BHT. The selection may be made based on either the current branch history contained in the branch history 26, based on the program counter value of the current branch, based on some combination of program counter value and branch history register 26, or in a variety of methods as known in the art. BTB controller 16 identifies a replacement candidate among the entries in BTB 14. BTB 14 provides the two bit predictor for the replacement candidate to logic 18. Logic 18 then determines if the current branch is more likely to be used than the replacement candidate. If the current branch is more likely to be used, then the BTB controller performs an allocate and replaces the replacement candidate with the current branch. The BTB controller is operated responsive to processing logic 12 and thus receives the needed information concerning the current branch from processing logic 12. If the replacement candidate is more likely to be used, then it is a no allocate situation and the replacement candidate is retained in BTB 14, and no allocation is performed in BTB 14 for the current branch.

An example of the basis for logic 18 deciding if it is a no allocate situation or if an allocate should be performed is shown in FIG. 2. Shown in FIG. 2 is a table showing the four possible predictions for the replacement candidate of strongly not-taken, weakly not-taken, weakly taken, and strongly taken. For each of these four possibilities for the replacement candidate, the same four possibilities exist for the current branch and are shown in the table. Thus, there are sixteen possible combinations shown and the corresponding decision is shown in the table for each of the combinations. For the case where the replacement candidate is predicted as strongly not-taken, the decision is to allocate regardless of the prediction of the current branch. In this case the current branch has a higher prediction for being taken for three of the possibilities and is tied on the fourth. Because the current branch was taken more recently than the replacement candidate, the decision is to allocate. For the case of the replacement candidate having the prediction of weakly not-taken, the decision is still to allocate for all four possibilities. A different decision for this case is a reasonable possibility. For the case where the prediction is weakly not-taken for the replacement candidate and the prediction is strongly not taken for the current branch, the prediction is slightly more favorable, a one category difference, for the replacement candidate but the decision is still to allocate. The more recent execution of the current branch is considered more favorable than the slight difference in prediction. In the case of weakly taken for the replacement candidate branch, the decision is to allocate except for the case of the current branch being strongly not-taken, which is a two category difference. For the one category difference of the current branch being weakly not-taken, the decision is to allocate. Again a different decision would be considered reasonable for this case. For the case of the replacement candidate branch having a prediction of strongly taken, the decision to allocate is only for the current branch having predictions of weakly not-taken and strongly not-taken. As in the previous two cases, where there is only a one category difference in favor of the replacement candidate the decision is to allocate but it would be reasonable to decide the opposite way. Alternatives to the decision outcome of allocating or not allocating for the entries in FIG. 2 are anticipated by the current invention, particularly for the cases where the replacement candidate branch has a more favorable outcome of being taken by a one category difference. This decision may be implemented by logic 18, and in some embodiments, multiple tables such as the table illustrated in FIG. 2 may be implemented, with different allocation decisions for certain of the entries in the tables, and a dynamic selection process may be used by logic 18 to determine which of the plurality of tables to rely on when making an allocation determination for the current branch when it misses in the BTB.

A further consideration in making the allocation decision is taking into account a confidence predictor provided by confidence predictor 28 of BHT 20. The confidence predictor is used to further modify the predictions. In the example of the table of FIG. 2, the predictions are considered to be high in confidence for the current branch. A low degree of confidence could alter the decision. For example, if the degree of confidence was low for the prediction of the current branch being weakly taken and the replacement candidate being strongly taken, the better decision may be no allocate. In the case where the confidence is very low, it could even switch the decision for the case where both the replacement candidate and the current branch are predicted as weakly taken from allocate to no allocate. Logic 18 may be used to alter one or more of the entries in the table shown in FIG. 2 based on the confidence value provided by confidence predictor 28, or may be used to select among one or more of a plurality of tables of allocation decisions in some embodiments. Note that while confidence predictor 28 is shown as being part of BHT 20, in alternate embodiments, confidence predictor 28 could exist as an independent structure. In another alternate embodiment, multiple predictors may be used instead of a single BHT 20, and confidence predictor 28 could select one of the multiple predictions for the multiple predictors for a current branch as the prediction to be used for the selection process performed by logic 18 based on the table entries of FIG. 2. In yet another embodiment, each of the multiple predictors could have its own table of replacement decisions, and the selection of the specific predictor to be used for the current branch by confidence predictor 28 could also select the particular table associated with that specific selected predictor for use by logic 18 in making an allocation determination.

The history approach to providing the prediction is generally considered the most accurate and adding the confidence factor provides further guidance in making a decision. There are other techniques for providing a prediction that are well respected and may offer advantages such as simplicity and speed. The described approach of comparing the prediction of the replacement candidate with the prediction of the current branch in making a decision between allocate and no allocate may benefit from using a history approach enhanced by the confidence approach. Other predictive schemes may also be effective. An improvement in the allocation of the BTB may still be achieved using another approach for obtaining the prediction for the current branch as well as for the replacement candidate. Whatever predictive scheme is selected, it is a further improvement to compare the predictions of the replacement candidate and current branch for a decision as to whether to replace a current entry in a BTB with a new entry for a current branch which misses in the BTB.

By now it should be appreciated that there has been provided a method for allocating an entry of a plurality of entries in a branch target buffer (BTB). The method includes receiving a branch instruction to be executed in a data processor. The method further includes determining that the BTB does not include an entry corresponding to the branch instruction. The method further includes identifying an entry in the BTB for allocation, the identified entry in the BTB comprising a target identifier and a first prediction value for a previously received branch instruction. The method further includes determining whether to allocate the branch instruction to the identified entry in the BTB based on a comparison of the first prediction value to a second prediction value. The method may be further characterized by the step of determining being further characterized by the second prediction value being generated from a branch history table (BHT). The method may further comprise allocating the branch instruction to the identified entry if the second prediction value indicates a more strongly taken prediction than the first prediction value. The method may further comprise shifting a plurality of bits into a branch history register, wherein each bit of the plurality of bits indicates a result of a branch instruction, and wherein one or more of the plurality of bits are used in creating an index to address the BHT. The method may further comprise updating the BHT when a change-of-instruction-flow occurs as a result of the branch instruction. The method may be further characterized by the second prediction value being based on outcomes of a plurality of previous instruction branches. The method may be further characterized by the second prediction value being based on outcomes of a plurality of previous instruction branches. The method may further comprise generating a prediction confidence value based on a number of correct predictions, combining the prediction confidence value with the second prediction value to generate a third prediction value, and using the third prediction value to determine whether to allocate the branch instruction to the identified entry. The method may be further characterized by the first prediction value comprising a two-bit prediction value for indicating one of a strongly not-taken state, a weakly not-taken state, a weakly taken state, and a strongly taken state. The method may be further characterized by the second prediction value comprising a two-bit prediction value for indicating one of a strongly not-taken state, a weakly not-taken state, a weakly taken state, and a strongly taken state.

Also disclosed is a method for allocating an entry of a plurality of entries in a branch target buffer (BTB) in a data processing system. The method includes receiving a plurality of instructions to be executed in the data processing system, the plurality of instructions comprising one or more branch instructions. The method further includes generating a branch history table (BHT), wherein the BHT is based on an accumulation of change-of-instruction-flow results during instruction execution of the plurality of instructions, wherein the accumulation of change-of-instruction-flow results are used to generate a first prediction value. The method further includes receiving a first branch instruction to be executed in the data processing system. The method further includes determining that the BTB does not include an entry corresponding to the first branch instruction. The method further includes identifying an entry in the BTB for allocation, the identified entry in the BTB comprising a second prediction value for a second branch instruction. The method further includes determining whether to allocate the first branch instruction to the identified entry in the BTB based on a comparison of the first prediction value to the second prediction value. The method further includes allocating the first branch instruction to the identified entry if the first prediction value indicates a more strongly taken prediction than the second prediction value, and not allocating the entry to the second branch instruction if the first prediction value indicates a more strongly not taken prediction than the second prediction value. The method may further include generating a prediction confidence value based on a number of correct predictions in the data processing system, combining the prediction confidence value with the first prediction value to generate a third prediction value, and using the third prediction value to determine whether to allocate the branch instruction to the identified entry. The method may be further characterized by the first prediction value comprises a two-bit prediction value for indicating one of a strongly not-taken state, a weakly not-taken state, a weakly taken state, and a strongly taken state. The method may be further characterized by the second prediction value comprises a two-bit prediction value for indicating one of a strongly not-taken state, a weakly not-taken state, a weakly taken state, and a strongly taken state. The method may further comprise shifting a plurality of bits into a branch history register, wherein each bit of the plurality of bits indicates a result of a branch instruction, and wherein at least one of the plurality of bits is used to generate an index to address the BHT.

Disclosed also is a data processing system. The data processing system includes processing logic for executing instructions. The data processing system further includes a branch target buffer (BTB) coupled to the processing logic, the BTB having a plurality of entries, an entry of the plurality of entries comprising a first prediction value corresponding to a first branch instruction. The data processing system further includes a BTB controller, coupled to the BTB, for selecting an entry of the plurality of entries is to be replaced. The data processing system further includes a branch history table (BHT), coupled to the processing logic, for providing a second prediction value based on an accumulation of change-of-instruction-flow results during execution of the plurality of instructions, the second prediction value corresponding to a second branch instruction. The data processing system further includes BTB replacement allocation logic coupled to the BTB for receiving the first prediction value and to the BHT for receiving the second prediction value, the BTB replacement allocation logic for performing a comparison of the first prediction value to the second prediction value, and for causing the entry of the plurality of entries to be allocated to the second branch instruction based on the comparison. The data processing system may further comprise a confidence predictor coupled to the BTB replacement allocation logic, the confidence predictor for generating a prediction confidence value based on a number of correct branch predictions, wherein the prediction confidence value is combined with the second prediction value to generate a third prediction value, and wherein the third prediction value is used to determine whether to allocate the entry of the plurality of entries to the second branch instruction. The data processing system may be further characterized by the first prediction value comprising a two-bit prediction value for indicating one of a strongly not-taken state, a weakly not-taken state, a weakly taken state, and a strongly taken state. The data processing system may be further characterized by the second prediction value comprising a two-bit prediction value for indicating one of a strongly not-taken state, a weakly not-taken state, a weakly taken state, and a strongly taken state. The data processing system may be further characterized by the comparison determining that if the second prediction value indicates a more strongly taken value than the first prediction value, the entry of the plurality of entries is allocated for the second branch instruction.

Because the apparatus implementing the present invention is, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, BTB 14 was described as having 32 entries whereas a different number may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:
1. A method for allocating an entry of a plurality of entries in a branch target buffer (BTB), the method comprising:
   receiving a branch instruction to be executed in a data processor;
   determining that the BTB does not include an entry corresponding to the branch instruction;

identifying an entry in the BTB for allocation, the identified entry in the BTB comprising a target identifier and a first prediction value for a previously received branch instruction; and determining whether to allocate the branch instruction to the identified entry in the BTB based on a comparison of the first prediction value to a second prediction value, wherein the second prediction value is based on outcomes of a plurality of previous instruction branches.

2. The method of claim 1, wherein the step of determining is further characterized by the second prediction value being generated from a branch history table (BHT).

3. The method of claim 2, further comprising allocating the branch instruction to the identified entry if the second prediction value indicates a more strongly taken prediction than the first prediction value.

4. The method of claim 2, further comprising shifting a plurality of bits into a branch history register, wherein each bit of the plurality of bits indicates a result of a branch instruction, and wherein one or more of the plurality of bits are used in creating an index to address the BHT.

5. The method of claim 2, further comprising updating the BHT when a change-of-instruction-flow occurs as a result of the branch instruction.

6. The method of claim 1, wherein allocating the branch instruction to the identified entry further comprises not allocating the branch instruction to the identified entry if the second prediction value indicates that the branch is not likely to be taken.

7. The method of claim 1, further comprising:
generating a prediction confidence value based on a number of correct predictions;
combining the prediction confidence value with the second prediction value to generate a third prediction value; and
using the third prediction value to determine whether to allocate the branch instruction to the identified entry.

8. The method of claim 1, wherein the second prediction value comprises a two-bit prediction value for indicating one of a strongly not-taken state, a weakly not-taken state, a weakly taken state, and a strongly taken state.

9. A method for allocating an entry of a plurality of entries in a branch target buffer (BTB), the method comprising:
receiving a branch instruction to be executed in a data processor;
determining that the BTB does not include an entry corresponding to the branch instruction;
identifying an entry in the BTB for allocation, the identified entry in the BTB comprising a target identifier and a first prediction value for a previously received branch instruction; and
determining whether to allocate the branch instruction to the identified entry in the BTB based on a comparison of the first prediction value to a second prediction value,
wherein the first prediction value comprises a two-bit prediction value for indicating one of a strongly not-taken state, a weakly not-taken state, a weakly taken state, and a strongly taken state.

10. A method for allocating an entry of a plurality of entries in a branch target buffer (BTB) in a data processing system, the method comprising:
receiving a plurality of instructions to be executed in the data processing system, the plurality of instructions comprising one or more branch instructions;
generating a branch history table (BHT), wherein the BHT is based on an accumulation of change-of-instruction-flow results during instruction execution of the plurality of instructions, wherein the accumulation of change-of-instruction-flow results are used to generate a first prediction value;
receiving a first branch instruction to be executed in the data processing system;
determining that the BTB does not include an entry corresponding to the first branch instruction;
identifying an entry in the BTB for allocation, the identified entry in the BTB comprising a second prediction value for a second branch instruction;
determining whether to allocate the first branch instruction to the identified entry in the BTB based on a comparison of the first prediction value to the second prediction value; and
allocating the first branch instruction to the identified entry if the first prediction value indicates a more strongly taken prediction than the second prediction value, and not allocating the entry to the second branch instruction if the first prediction value indicates a more strongly not taken prediction than the second prediction value.

11. The method of claim 10, further comprising:
generating a prediction confidence value based on a number of correct predictions in the data processing system;
combining the prediction confidence value with the first prediction value to generate a third prediction value; and
using the third prediction value to determine whether to allocate the branch instruction to the identified entry.

12. The method of claim 10, wherein the first prediction value comprises a two-bit prediction value for indicating one of a strongly not-taken state, a weakly not-taken state, a weakly taken state, and a strongly taken state.

13. The method of claim 10, wherein the second prediction value comprises a two-bit prediction value for indicating one of a strongly not-taken state, a weakly not-taken state, a weakly taken state, and a strongly taken state.

14. The method of claim 10, further comprising shifting a plurality of bits into a branch history register, wherein each bit of the plurality of bits indicates a result of a branch instruction, and wherein at least one of the plurality of bits is used to generate an index to address the BHT.

15. A data processing system comprising:
processing logic for executing instructions;
a branch target buffer (BTB) coupled to the processing logic, the BTB having a plurality of entries, an entry of the plurality of entries comprising a first prediction value corresponding to a first branch instruction;
a BTB controller, coupled to the BTB, for selecting an entry of the plurality of entries is to be replaced;
a branch history table (BHT), coupled to the processing logic, for providing a second prediction value based on an accumulation of change-of-instruction-flow results during execution of the plurality of instructions, the second prediction value corresponding to a second branch instruction; and
BTB replacement allocation logic coupled to the BTB for receiving the first prediction value and to the BHT for receiving the second prediction value, the BTB replacement allocation logic for performing a comparison of the first prediction value to the second prediction value, and for causing the entry of the plurality of entries to be allocated to the second branch instruction based on the comparison.

16. The data processing system of claim 15, further comprising a confidence predictor coupled to the BTB replacement allocation logic, the confidence predictor for generating a prediction confidence value based on a number of correct branch predictions, wherein the prediction confidence value is combined with the second prediction value to generate a third prediction value, and wherein the third prediction value is used to determine whether to allocate the entry of the plurality of entries to the second branch instruction.

17. The data processing system of claim 15, wherein the first prediction value comprises a two-bit prediction value for indicating one of a strongly not-taken state, a weakly not-taken state, a weakly taken state, and a strongly taken state.

18. The data processing system of claim 15, wherein the second prediction value comprises a two-bit prediction value for indicating one of a strongly not-taken state, a weakly not-taken state, a weakly taken state, and a strongly taken state.

19. The data processing system of claim 15, wherein when the comparison determines that if the second prediction value indicates a more strongly taken value than the first prediction value, the entry of the plurality of entries is allocated for the second branch instruction.

* * * * *